(12) United States Patent
Seko et al.

(10) Patent No.: US 7,474,418 B2
(45) Date of Patent: Jan. 6, 2009

(54) POSITION MEASUREMENT SYSTEM

(75) Inventors: Yasuji Seko, Kanagawa (JP); Yoshinori Yamaguchi, Kanagawa (JP); Hiroyuki Miyake, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 39 days.

(21) Appl. No.: 11/206,974

(22) Filed: Aug. 19, 2005

(65) Prior Publication Data

US 2006/0215178 A1 Sep. 28, 2006

(30) Foreign Application Priority Data

Mar. 28, 2005 (JP) ............................ P2005-090830

(51) Int. Cl.
*G01B 11/26* (2006.01)
(52) U.S. Cl. .................. 356/614; 356/498; 356/621
(58) Field of Classification Search ............... 356/498, 356/519, 614
See application file for complete search history.

(56) References Cited

U.S. PATENT DOCUMENTS

| | | | | |
|---|---|---|---|---|
| 4,411,528 A | * | 10/1983 | Newcomb et al. | ............ 356/614 |
| 4,627,722 A | * | 12/1986 | Falk et al. | ................. 356/141.5 |
| 5,640,241 A | * | 6/1997 | Ogawa | ......................... 356/615 |
| 6,336,004 B1 | | 1/2002 | Ishii et al. | |
| 2004/0004723 A1 | * | 1/2004 | Seko et al. | ................... 356/498 |
| 2004/0051880 A1 | * | 3/2004 | Seko et al. | ................... 356/614 |

FOREIGN PATENT DOCUMENTS

| | | |
|---|---|---|
| JP | 04-346096 A | 12/1992 |
| JP | 2001-13248 A | 1/2001 |
| JP | 2004-212328 A | 7/2004 |

OTHER PUBLICATIONS

Yasuji Seko, et al.; "3D Position Sensing by the Single Camera with a Special Lens"; New Expansion and Fusion of Sensing Technologies; Sep. 14-15, 2004; pp. 1-10; Catalog No. 4; Hakusan Campus of Toyo University, Japan.

* cited by examiner

*Primary Examiner*—L. G Lauchman
*Assistant Examiner*—Rebecca C. Slomski
(74) *Attorney, Agent, or Firm*—Sughrue Mion, PLLC

(57) ABSTRACT

A position measurement system includes a photographing unit and an arithmetic processing unit. The photographing unit has a lens and a light-receiving element. The lens forms an optical ring image from light from a light source through spherical aberration. The light-receiving element detects the optical ring image formed by the lens. The arithmetic processing unit measures a distance to the light source on the basis of the quantity of light of the optical ring image detected by the light-receiving element.

12 Claims, 11 Drawing Sheets

POSITION MEASUREMENT SYSTEM

BACKGROUND OF THE INVENTION

1. Field of the Invention

The present invention relates to a position measurement system which measures a distance to a light source by detecting an optical ring image formed from light originating from the light source, by spherical aberration of a lens.

2. Description of the Preferred Embodiments

In relation to a technique for measuring a three-dimensional position of a light source with high accuracy and high resolving power, various methods have hitherto been proposed. For instance, one method employs a camera having an auto-focusing mechanism. This method requires two cameras, which in turn adds to cost, or suffers a problem of difficulty in speeding up measurement because focusing action involves consumption of time. Another method utilizes a laser beam as a light interference method. This technique uses a laser beam, and hence entails a problem of a necessity for safety precautions, or the like. Moreover, the so-called light interference lens method presents a problem of computation for measuring a position from an interference pattern being complicated.

JP-A-2004-212328 has been proposed as a measure for solving these problems. This technique is to measure the position of a light source (a point source of light) by utilization of spherical aberration of the lens. Specifically, according to this method, the light emitted from the light source; e.g., an LED, is converted into an optical ring image (a light-concentrated area) by spherical aberration of the lens. This optical ring image is detected by a CCD sensor, and the position of the light source is measured on the basis of detection information about the thus-detected optical ring image (e.g., the diameter of the optical ring).

SUMMARY OF THE INVENTION

The method described in JP-A-2004-212328 does not raise any problem, because the light source is close to the lens. However, when the light source is distant from the lens, the amount of change in the diameter of the optical ring image is small, and the resolving power of position measurement becomes lower. For this reason, the method described in JP-A-2004-212328 is not suitable for measuring a distance from a light source when the light source is remote from a lens, and entails a problem of a critical measurement distance for measuring a distance from the light source being short.

It is an object of the present invention to provide a position measurement system which enables an increase in measurable distance when a distance to a light source is measured by detecting an optical ring image formed as a result of spherical aberration of a lens.

According to one aspect of the invention, there is provided a position measurement system including: a photographing unit having a lens forming an optical ring image from light from a light source through spherical aberration, and a light-receiving element detecting the optical ring image formed by the lens; and an arithmetic processing unit for measuring a distance to the light source on the basis of the quantity of light of the optical ring image detected by the light-receiving element. Here, the arithmetic processing unit can measure the distance to the light source on the basis of a quantity of light in an unsaturated area of the optical ring image detected by the light-receiving element. Moreover, when a distance to the light source falls within a predetermined range, the arithmetic processing unit can measure the distance to the light source on the basis of the diameter of an optical ring image detected by the light-receiving element in place of a quantity of light of the optical ring image. Herein, the expression "when the distance to the light source falls within a predetermined range" means a case where the diameter of the optical ring image changes according to the distance to the light source and that the distance is within a range where the change is readily detected.

According to another aspect of the invention, there is provided a position measurement system including: a photographing unit having; a lens forming an optical ring image from light from a light source through spherical aberration; and a light-receiving element detecting the optical ring image formed by the lens; and an arithmetic processing unit measuring a distance to the light source on the basis of detection information about the optical ring image detected by the light-receiving element. The arithmetic processing unit measures the distance to the light source on the basis of a diameter of the optical ring image detected by the light-receiving element when the distance to the light source falls within a predetermined range. The arithmetic processing unit measures the distance to the light source on the basis of a quantity of light of the optical ring image detected by the light-receiving element when the distance to the light source falls outside the predetermined range.

Here, the arithmetic processing unit can measure the distance to the light source on the basis of a diameter of the optical ring image detected by the light-receiving element when the distance to the light source falls within a predetermined range, or can measure the distance to the light source on the basis of a quantity of light in an unsaturated area of the optical ring image detected by the light-receiving element when the distance to the light source falls outside the predetermined range. Moreover, the lens can be embodied by a hemispherical lens.

According to another aspect of the invention, a position measurement method including: forming an optical ring image from light from the light source through spherical aberration; detecting the formed optical ring image; and measuring a distance to the light source on the basis of a quantity of light of the detected optical ring image. Here, the quantity of light of the detected optical ring image can be taken as a quantity of light in an unsaturated area of the optical ring image. Moreover, when the distance to the light source falls within a predetermined range, the distance to the light source can be measured on the basis of a diameter of the detected optical ring image in place of the quantity of light of the optical ring image.

According to another aspect of the invention, a position measurement method including: forming an optical ring image from light from the light source through spherical aberration, and detecting the formed optical ring image, measuring a distance to the light source on the basis of detection information about the detected optical ring image, measuring the distance to the light source on the basis of a diameter of the detected optical ring image when the distance to the light source falls within a predetermined range, and measuring the distance to the light source on the basis of a quantity of light in the detected optical ring image when the distance to the light source falls outside the predetermined range. Here, the quantity of light of the detected optical ring image can be taken as a quantity of light in an unsaturated area of the optical ring image. The optical ring image can be formed by spherical aberration of a hemispherical lens.

According to another aspect of the invention, there is provided a position measurement system including: a photographing unit having; a lens forming an optical ring image from light from a light source through spherical aberration; and a light-receiving element detecting the optical ring image formed by the lens; and an arithmetic processing unit measuring a distance to the light source on the basis of a quantity of light of the optical ring image detected by the light-receiving element. The distance to the light source is measured on the basis of a diameter of the optical ring image detected by the light-receiving element when the distance to the light source falls within a predetermined range. A value of position measurement is corrected on the basis of the quantity of light of the optical ring image.

According to the above-aspects of the invention, there can be obtained a position measurement system which enables an increase in measurable distance when a distance to a light source is measured by detecting an optical ring image formed as a result of spherical aberration of a lens. A related-art position measurement system determines a distance to a light source on the basis of a change in the diameter of an optical ring image. Hence, a critical measurement distance of the system is short. In contrast, according to the above-aspects of the invention, a remarkable increase can be achieved in critical measurement distance. Moreover, an increase in measurable distance can be achieved by merely improving software of the related-art position measurement system, and therefore can be implemented readily and at low cost.

BRIEF DESCRIPTION OF THE DRAWINGS

These and other objects and advantages of this invention will become more fully apparent from the following detailed description taken with the accompanying drawings in which:

FIG. 8 is a view showing an example of an optical ring image achieved when the position of the light source is comparatively far way from the lens, wherein

DESCRIPTION OF THE PREFERRED EMBODIMENTS

An embodiment of the present invention will be described hereinbelow. Before that, there will be described a method, which will be the premise of the embodiment, for measuring a distance from a light source by detecting an optical ring image formed from light from the light source through spherical aberration of a lens.

Figure 1A:
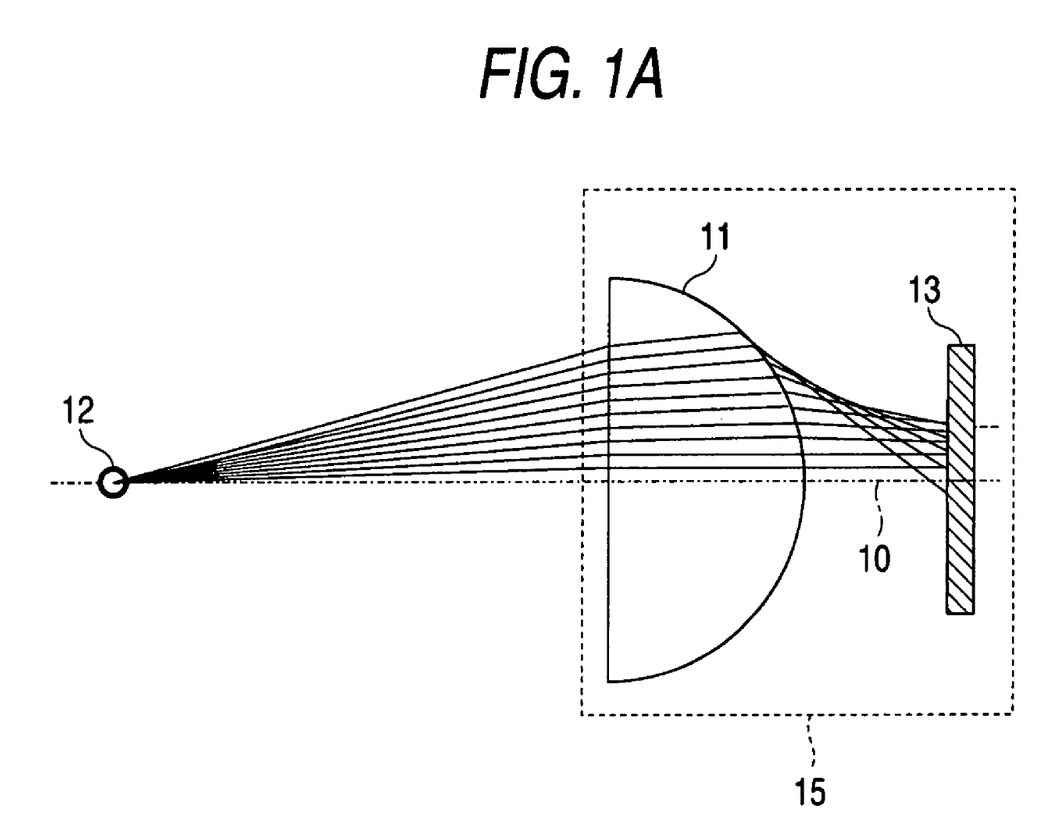
FIGS. 1A and 1B are views for describing a method for measuring the position of a light source using a camera (photographing unit) having a hemispherical lens and a light-receiving element.
Figure 1B:
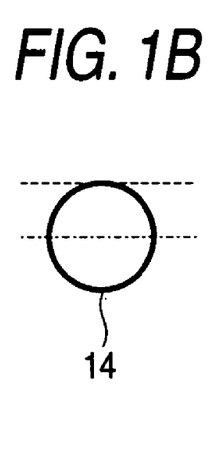

FIGS. 1A and 1B are views for describing a method for measuring the position of a light source through use of a camera (photographing unit) 15 having a hemispherical lens and a light-receiving element. As shown in FIG. 1A, light emitted from a light source (a point source of light) 12 is gathered by a hemispherical lens 11, thereby forming an optical ring 14, such as that shown in FIG. 1B, on a light-receiving element 13. The principle of the method is as described in previously-described Patent Document 1.

Specifically, in FIG. 1A, the light emitted from the point source of light 12 enters a plane, which is a first plane of the hemispherical lens 11. Here, the light is subjected to refraction in accordance with Snell's law. The light now reaches a second, spherical face of the lens, where the light undergoes refraction. Since the second plane is a spherical surface, the light is gathered at any point on an optical axis 10. Since the spherical aberration of the lens is great, the light is gathered not at a single point, but within a range of certain expanse on the optical axis. When the light is tracked down, the light having passed through a lens area close to the optical axis is known to be gathered at a point on the optical axis distant from the lens. In contrast, the light having passed through a lens area distant from the optical axis is known to be gathered at a point on the optical axis close to the lens. Therefore, when a light-receiving surface of the light-receiving element (CCD sensor) 13 is placed at a position on the optical axis such as that shown in FIG. 1A, the position of light on the light-receiving surface first departs from the optical axis as the light departs from the vicinity of the optical axis of the lens. However, when the light has further departed from the optical axis of the lens, the refraction effect of the lens becomes greater this time, whereupon the light starts to change direction and approach the optical axis. Namely, the light shows such a behavior that, as the light passing through the lens departs from the optical axis, the light first departs from the optical axis on the light-receiving surface and starts approaching the optical axis after having changed direction at any point on the optical axis. The light exhibits a behavior of further passing through the optical axis and spreading to the other side. From the viewpoint of a two-dimensional plane of the light-receiving surface, the turn-around point forms a circle around the optical axis. The turn-around point turns into a light-concentrated area having high light density. Consequently, an optical ring 14, such as that shown in FIG. 1B, is formed.

Figure 2:
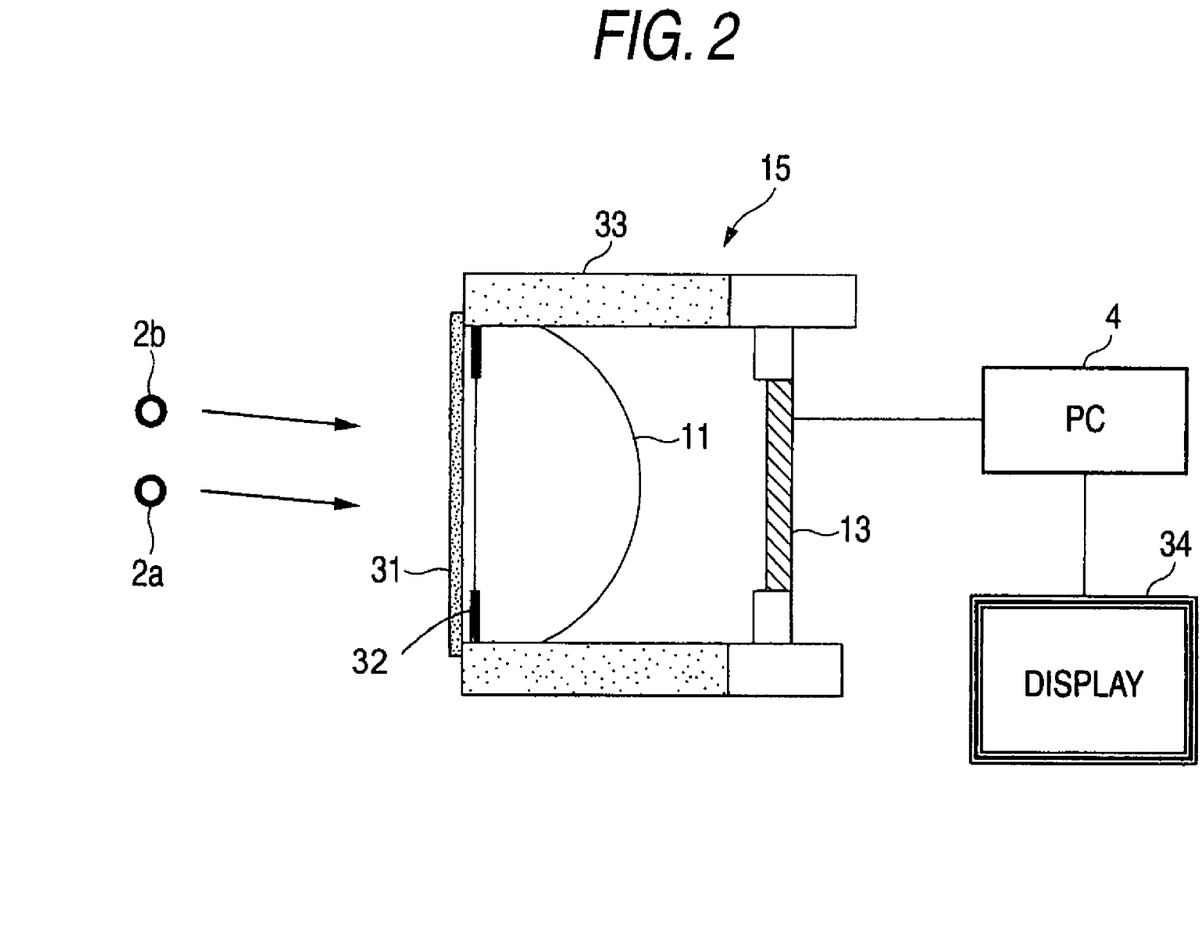
FIG. 2 is a view showing an embodiment where positions of two light sources are simultaneously measured through use of a single hemispherical lens.

When the light source is situated at the optical axis, the optical ring 14 assumes the shape of a complete circle. As the light source departs from the lens, the diameter of the optical ring decreases. In contrast, as the light source approaches the lens, the diameter of the optical ring increases. Moreover, when the light source has moved in a direction perpendicular to the optical axis, the overall optical ring moves in a direction opposite the moving direction of the light source. Consequently, a relationship between the position of the light source and the geometry and coordinates of the optical ring is expressed mathematically, whereby coordinates of the light source can be measured from a signal pertaining to the geometry and coordinates of the optical ring. For instance, coordinates of the light source can be determined as follows:

Here, a case where positions of two light sources have been simultaneously measured through use of one hemispherical lens is described by reference to FIG. 2. As shown in FIG. 2, a light-emitting diode (LED) having a wavelength of 900 nm is for light sources 2a, 2b, respectively. The light emitted from the light sources 2a, 2b passes through an infrared-radiation-translucent filter 31 of a camera 15 and enters the hemispherical lens 11. A hemispherical lens having a refraction factor of 1.51 and a curvature radius of 10 mm is utilized for the hemispherical lens 11. A flat plane of the hemispherical lens 11 is taken as a front surface. Moreover, with a view toward eliminating excessive light, an aperture 32 having a diameter of Φ 6 mm is placed on the front surface of the lens. The hemispherical lens 11 is supported by a lens holder 33.

The position of a focal point of a paraxial ray in relation to an infinite light source of the hemispherical lens 11 is situated at a location which is spaced rearward from an exit plane of the hemispherical lens by 19.5 mm. A ring image (optical ring) having higher light intensity at the periphery thereof, which is generated by a high spherical aberration effect, can be formed by placing the hemispherical lens 11 at a position closer to the lens with reference to the position of the focal point. Here, the light-receiving element (image sensor) 13 is situated at a position which is spaced rearward from the hemispherical lens 11 by 6 mm, thereby detecting the optical ring. Information about detection of the optical ring acquired by the image sensor 13 is computed by a PC (or an arithmetic processing unit) 4, and a result of computation is displayed on a display 34.

Figure 3:
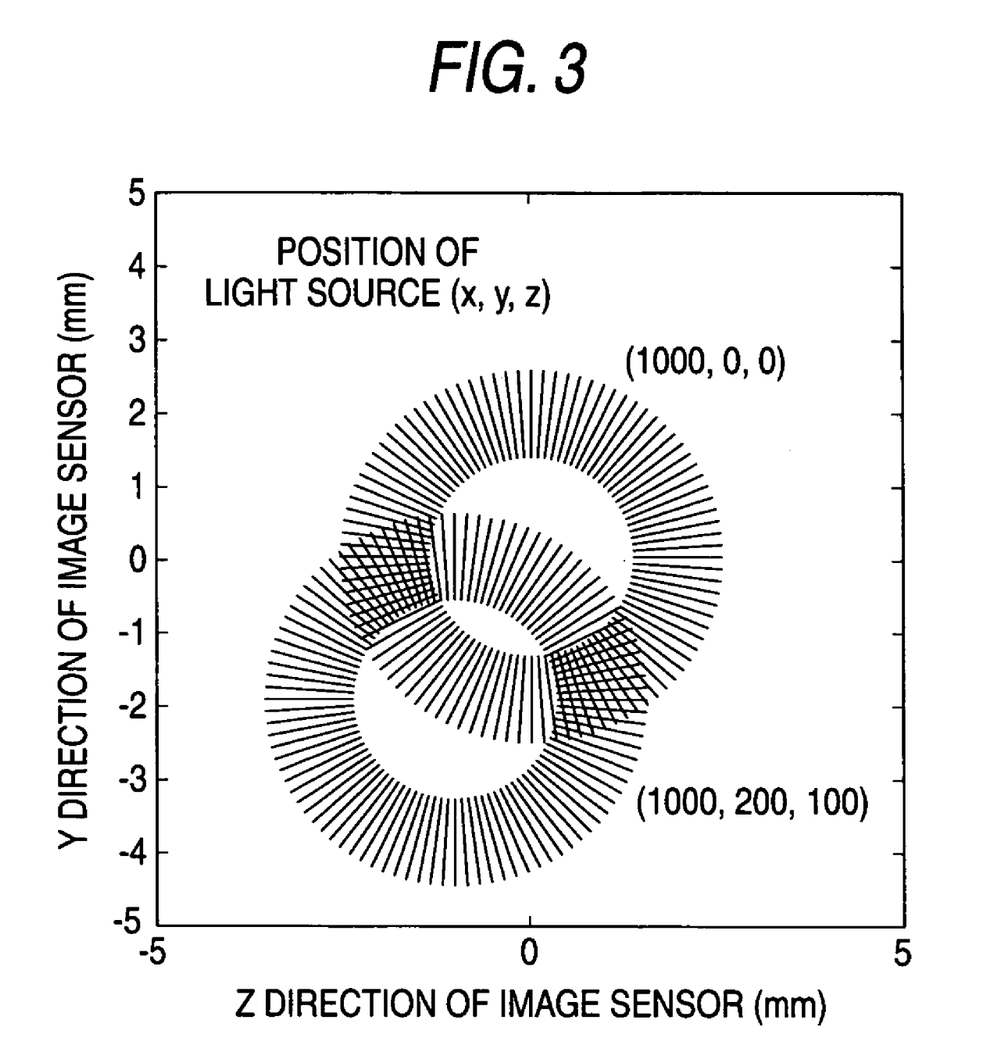
FIG. 3 is a view showing an example of a ring image formed in the case shown in FIG. 2.

FIG. 3 shows an example of a ring image formed in this case. Specifically, FIG. 3 shows a result of simulation. An actually-photographed image can be ascertained to coincide with this result. The light source 2a is placed at positional coordinates (1000, 0, 0), and the light source 2b is placed at coordinates (1000, 200, 100). As shown in FIG. 3, two optical rings overlap each other, but the optical rings have high light intensity at outer edges thereof. Hence, the optical rings can be readily distinguished from each other. Three-dimensional positions of the respective light sources 2a, 2b can be measured from the outer diameters and centers of the respective optical rings.

Figure 4:
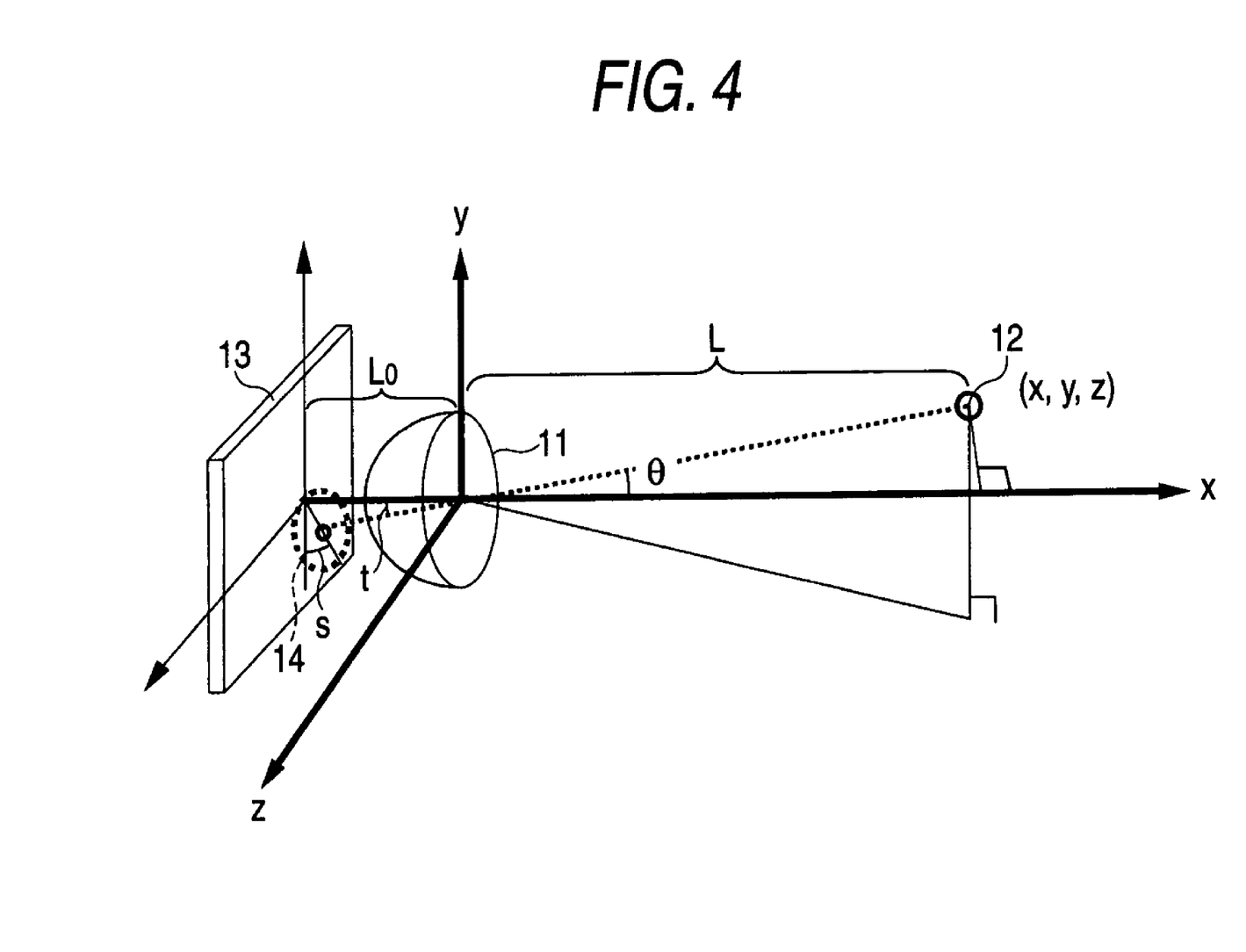
FIG. 4 is a schematic diagram showing a relationship between three-dimensional coordinates of a light source and an optical ring for describing computation of the position of the light source.

FIG. 4 is a schematic diagram showing a relationship between three-dimensional coordinates of the light source 12 and the optical ring 14 formed on the light receiving element 13, for use in describing computation of the coordinates of the light source 12. When the three-dimensional coordinates of the light source (LED) are assumed to be (x, y, z), x, y, and z are approximately expressed as follows: Here, θ denotes an angle formed by the optical axis of the flat plane of the lens 11 with the light source 12; and "s" denotes an angle formed between the center of the optical ring 14 and a vertical line with respect to the point of optical axis within the sensor plane.

$$x = L * \cos(\theta) \quad \text{(Eq. 1)}$$

$$y = L * \sin(\theta) * \cos(s) \quad \text{(Eq. 2)}$$

$$z = L * \sin(\theta) * \cos(s) \quad \text{(Eq. 3)}$$

The diameter D of the optical ring is approximately expressed as follows in terms of a distance L from the point of the optical axis in the flat plane of the lens to the light source, and lens characteristic values "a" and "b." The lens characteristic values "a" and "b" are values determined on the basis of the curvature and refraction factor of the lens.

$$D = a/L + b \quad \text{(Eq. 4)}$$

The distance L of the light source is determined by substituting the diameter obtained by a camera image into Eq. 4, and the thus-determined distance L is substituted into Equations 1 to 3, whereby three-dimensional coordinates of the light source are determined.

Figure 5:
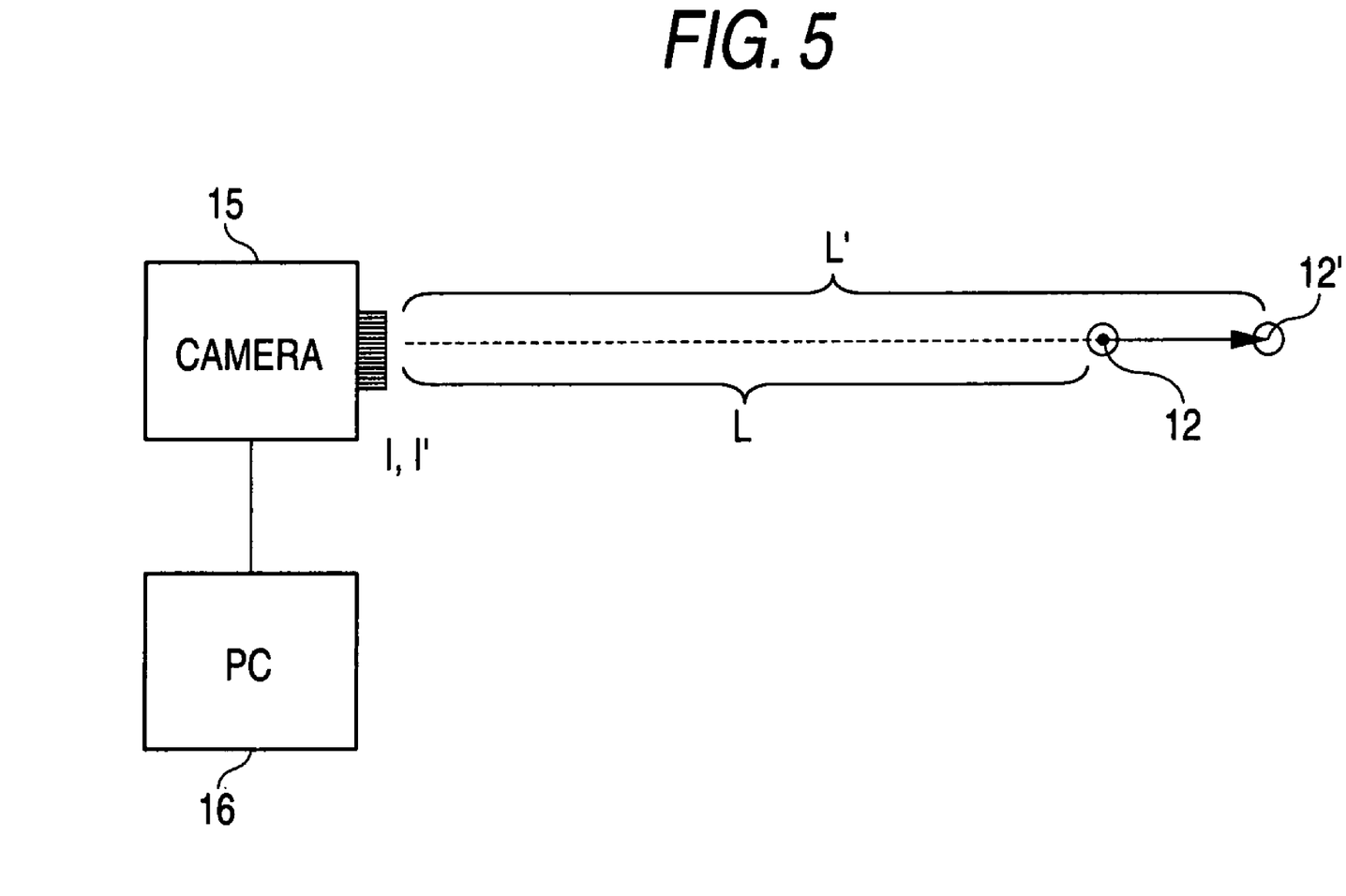
FIG. 5 is a view showing a position measurement system of an embodiment.

According to Eq. 4, the diameter of the ring is inversely proportional to the distance. Consequently, as the distance becomes greater, a/L approaches 0, to thus assume D≈b. Specifically, the ring diameter D becomes substantially irrelevant to the distance L of the light source. This means that, when the light source becomes separated far from the lens, the amount of change in the ring diameter of the optical ring image becomes smaller, which in turn results in a decrease in resolution power of position measurement. Specifically, according to the method, the critical distance for measuring a distance from a light source is short. The embodiment of the invention solves this problem as follows:

FIG. 5 is a view showing the embodiment of a position measurement system. As illustrated, the position measurement system of the present embodiment includes a camera (photographing unit) 15 having a lens for forming an optical ring image from the light emitted from the light source (e.g., an LED) 12 (12') through spherical aberration, and a light-receiving element (sensor) for detecting an optical ring image formed by the lens; and a PC (arithmetic processing unit) 16 for measuring a distance to the light source on the basis of the quantity of light acquired in a non-saturated area of the optical ring image detected by the light-receiving element. Now, the lens for forming the optical ring image is, e.g., a hemispherical lens. However, the lens is not limited to this lens. Moreover, although the light-receiving element is, e.g., a CCD area sensor, the sensor is not limited to this. Further, the optical ring image includes the previously-described optical ring serving as the light-concentrated area, and the inner portion of the ring. The unsaturated area of the optical ring image is referred to as an area where the light intensity of the optical ring image has not yet saturated. This will be described later.

In FIG. 5, total quantities of I, I' light received by the sensor of the camera 15 are expressed by the following equations, since the total quantities of light are inversely proportional to the squares of the distances L, L' from the light sources 12, 12'.

$$I = a/L^2 \quad \text{(Eq. 5)}$$

$$I' = a/(L')^2 \quad \text{(Eq. 6)}$$

The distance L' is expressed by the following equation from Eq. 5 and Eq. 6.

$$L' = L\sqrt{I/I'} \quad \text{(Eq. 7)}$$

Accordingly, the total quantities I, I' of light received by the camera 15 are monitored, so that a distance L' to a light source 12' can be computed from the value of the existing distance L when the distance to the light source has changed from L to L'. Correspondence between the quantities of light and the distance is stored in an internal table of the PC 16, and a corresponding distance can also be obtained from the table on the basis of the detected quantities of light. As a result, even when the position of the light source is comparatively distant from the lens and when no essential changes arise in the diameter of the ring, the distance to the light source can be measured with high accuracy by monitoring changes in the total quantity of light received by the sensor.

Figure 6:
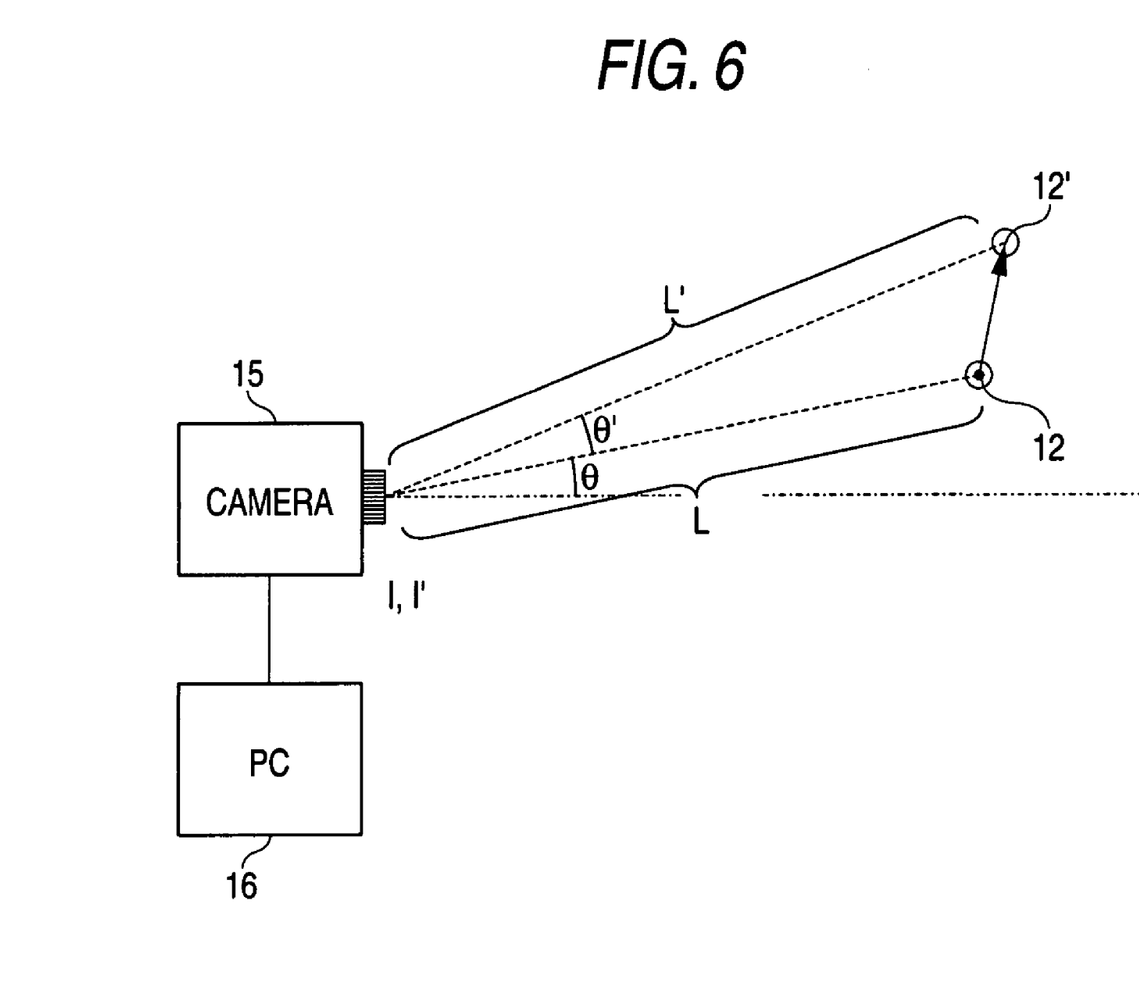
FIG. 6 is a view showing another embodiment of the position measurement system.

FIG. 6 is a view showing another embodiment of the position measurement system. The previously-described embodiment relates to a case where the light source moves over the optical axis, whereas the present embodiment is directed toward a case where the light source freely moves in areas other than the optical axis. Specifically, when angles formed by lines connecting light sources 12, 12' to the camera 15 with the optical axis are θ, θ', the total quantities I, I' of light received by the sensor of the camera 15 are expressed by the following equations.

$$I = a \cdot \cos\theta / L^2 \quad \text{(Eq. 8)}$$

$$I' = a \cdot \cos\theta' / (L')^2 \quad \text{(Eq. 9)}$$

The distance L' is expressed as the following equation on the basis of Eq. 8 and Eq. 9.

$$L' = L\sqrt{I\cos\theta'/(I'\cos\theta)} \quad \text{(Eq. 10)}$$

The angles θ, θ' are determined from the center position of the ring image. Therefore, even when angles formed between the light source and the lenses have changed, the distance L' can be measured with high accuracy by monitoring the quantity of light. Correspondence between the quantity of light and the distance is stored in the internal table of the PC 16, and a corresponding distance can also be obtained from the table on the basis of the detected quantity of light. As a result, even when the position of the light source is comparatively distant from the lens and no essential change arises in the ring diameter, a distance to the light source can be measured with high accuracy by monitoring changes in the total quantity of light received by the sensor.

Figure 7A:
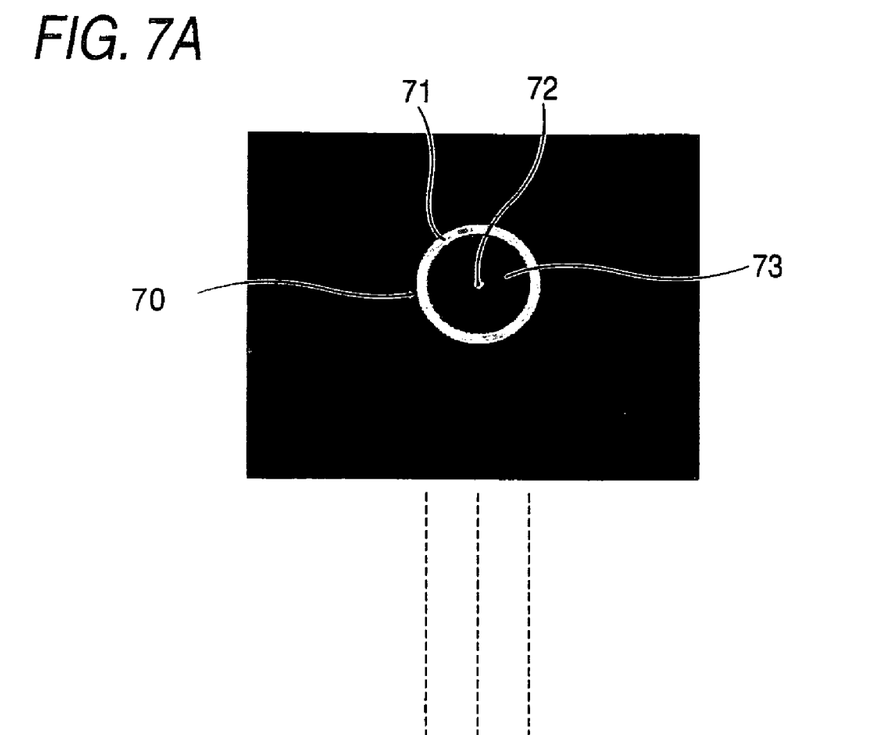
FIGS. 7A and 7B are views showing an embodiment of an optical ring image achieved when the position of the light source is comparatively close to the lens.
Figure 7B:
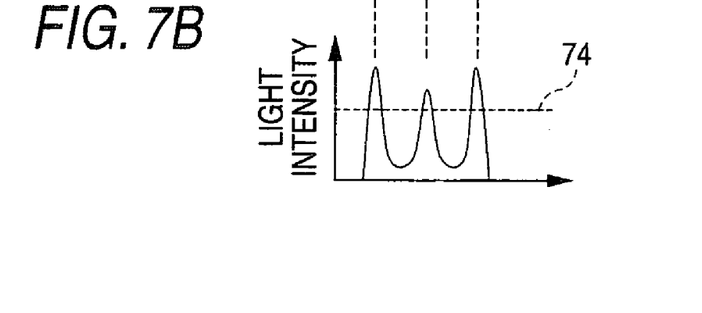

FIGS. 7A and 7B are views showing an example optical ring image achieved when the position of the light source is comparatively close to the lens. As mentioned previously, the total quantity of light received by the sensor is expressed as a function of a distance to a light source. However, as shown in FIG. 7A, when the position of the light source is close to the lens, an outer edge portion (an optical ring) 71 and a center portion 72 of an optical ring image 70 have high light intensity (brightness), and an intermediate portion 73 of the optical ring image has low light intensity (brightness). Therefore, as shown in FIG. 7B, there may arise a case where brightness becomes saturated in the outer edge portion 71 and the center portion 72 in excess of a dynamic range 74 of the sensor. In the meantime, in the intermediate portion 73, brightness fails to exceed the dynamic range 74 of the sensor and become saturated. Accordingly, the total quantity of light entering the lens cannot be expressed in relation to the position of the light source by Eq. 5 to Eq. 10. There is collected information about only the pixels corresponding to the intermediate portion 73 (the unsaturated area) where the brightness of the sensor that receives the optical ring image has not become saturated, thereby monitoring the total quantity of light in that area (the unsaturated area). The reason for this is that the information about the pixels corresponding to the unsaturated area changes with a distance to the light source; that is, the information about the pixels has distance information. As a result, the distance to the light source can be measured with superior accuracy through use of Eq. 5 to Eq. 10, and the measurable range can also be extended.

Figure 8A:
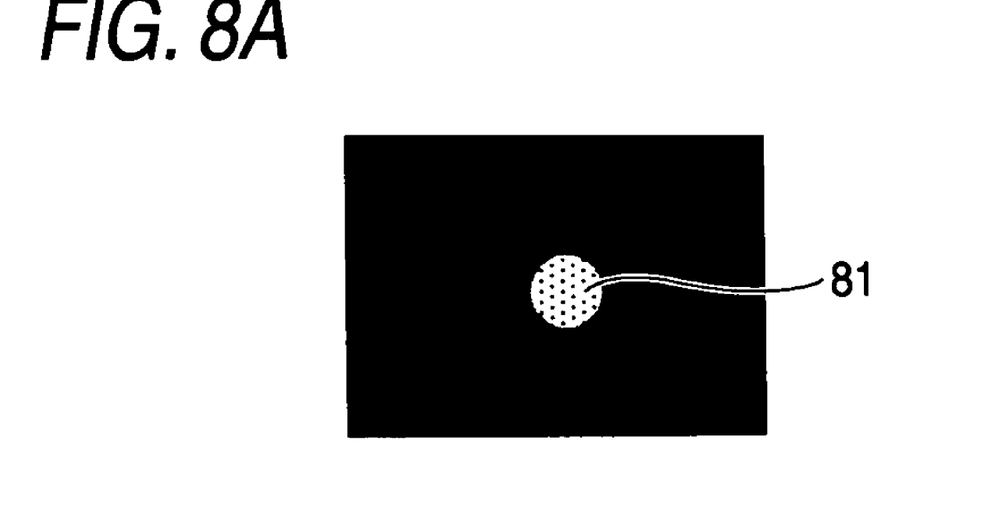
FIG. 8A shows a ring image acquired in the vicinity of a critical distance where position measurement can be effected.
Figure 8B:
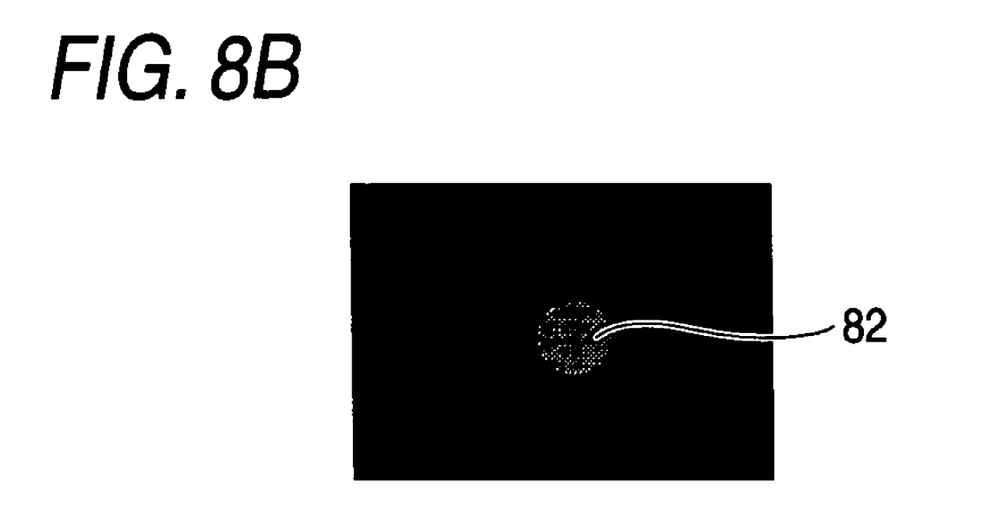
FIG. 8B shows a ring image acquired when the light source is moved much farther away, beyond the critical distance.

FIG. 8 is a view showing an embodiment of an optical ring image acquired when the position of the light source is comparatively distant from the lens. FIG. 8A shows a ring image achieved in the vicinity of a critical distance where positional measurement can be performed; and FIG. 8B shows a ring image acquired when the ring image is moved farther away by the amount greater than the critical distance. In this embodiment, the entirety of each of optical ring images 81, 82 is an unsaturated area, where brightness fails to exceed the dynamic range of the sensor and become saturated. The optical ring image 82 is situated distant from the optical ring image 81, and hence brightness of the ring image becomes lower correspondingly. In this case, the distance to the light source can be measured with superior accuracy through use of Eq. 5 to Eq. 10 by application of the total quantity of light. Moreover, the measurable distance can be extended.

Figure 9:
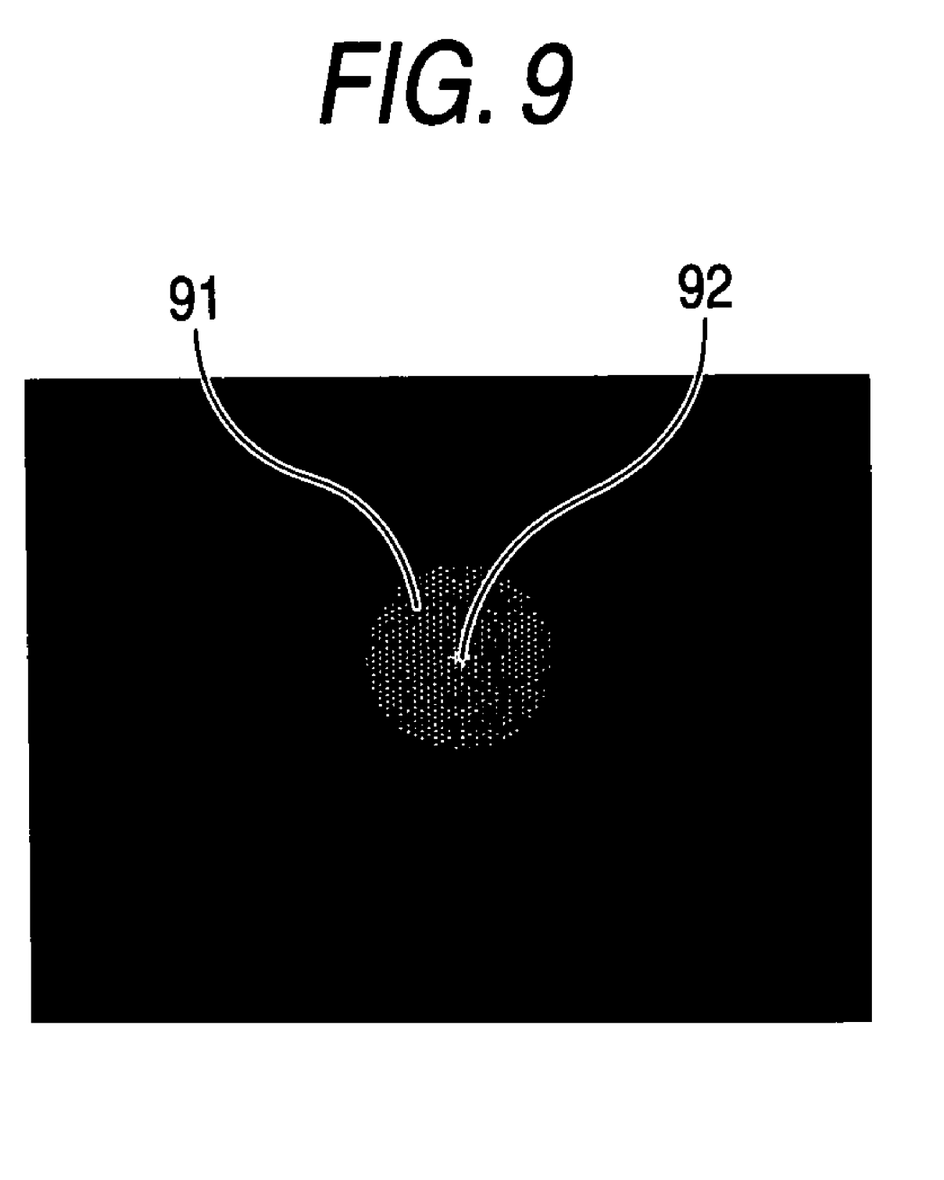
FIG. 9 is a view showing an example of an optical ring image acquired when the position of the light source is very far away from the lens.

FIG. 9 is a view showing an embodiment of an optical ring image acquired when the position of the light source is far distant from the lens. In this case, the quantity of light in a ring outer edge portion 91 becomes low, so that there may sometimes arise a case where extraction of the edge of the optical ring image is not easy. Even in this case, since the quantity of light in a center portion 92 of the optical ring image is high, the position of the center portion can be measured readily. A direction in which the light source is present is determined from the center position, and the distance from the light source can be determined from the quantity of light of the entire optical ring image. In this case, the entire optical ring image also corresponds to an unsaturated area where brightness does not become saturated in excess of the dynamic range of the sensor. Accordingly, the distance to the light source can be measured with high accuracy by application of the total quantity of light through use of Eq. 5 to Eq. 10. Moreover, the measurable distance can be extended.

As mentioned previously, the embodiment of the present invention is directed toward measurement of a distance to the light source (a point source of light) on the basis of the quantity of light in the unsaturated area of the optical ring image formed from spherical aberration of the lens. However, when the distance to the light source is short, the distance to the light source is measured on the basis of the ring diameter (diameter) of the optical ring image, as before. When the distance to the light source has become greater, no essential change arises in the diameter of the ring. Accordingly, a distance to the light source can be measured on the basis of the quantity of light in the optical ring image (an unsaturated area). As mentioned above, the measurable range can also be extended by combined use of these operations. Even in this case, in relation to the distance from the light source, a correlation between the quantity of light and the ring diameter and a correlation between the quantity of light and a distance may be stored in the internal table of the PC, and a corresponding distance can also be obtained from the table on the basis of the detected quantity of light.

There will now be described an embodiment where an optical ring image is formed by utilization of spherical aberration of a lens; and where a three-dimensional (3D) position of the light source is measured by utilization of the total quantity of light of the optical ring image.

Figure 10A:
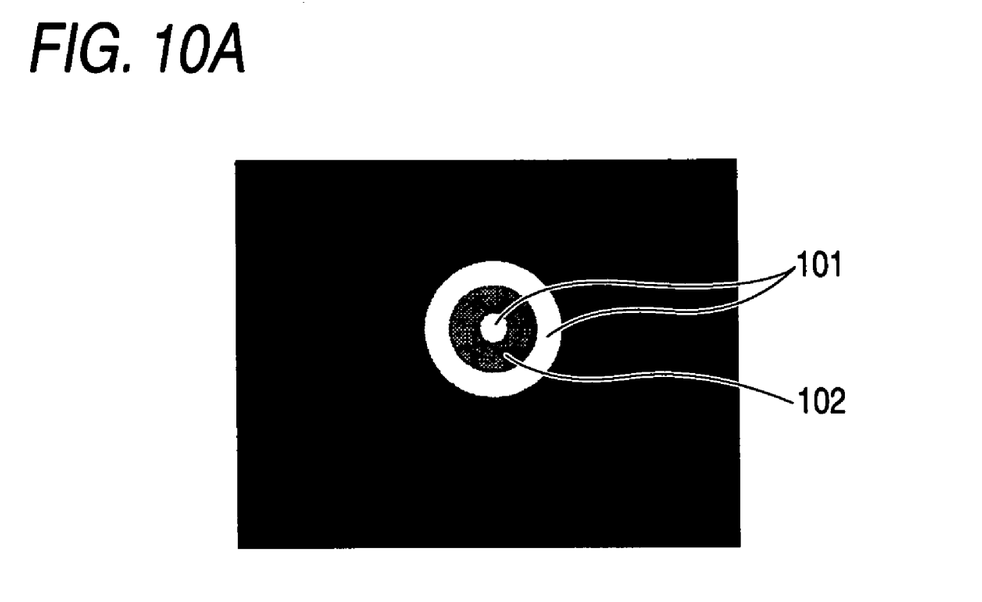
FIGS. 10A and 10B are views showing the nature of changes in the distribution of light quantity of an optical ring image when the light source LED has moved away from the position of a comparatively close distance.
Figure 10B:
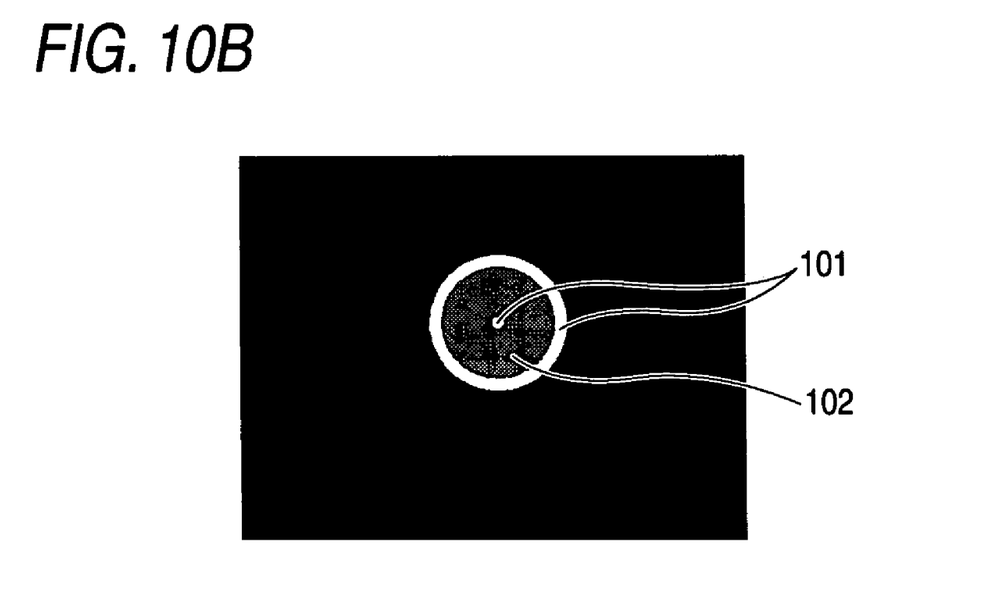
Figure 11:
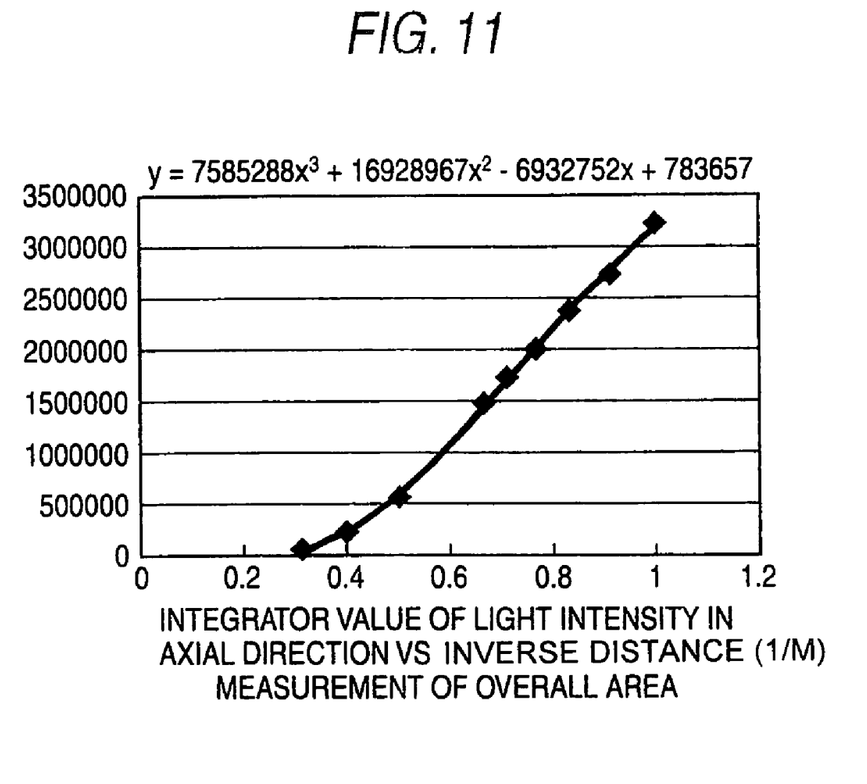
FIG. 11 is a graph showing an example of test data obtained by measuring changes in the total quantity of light of the optical ring image in relation to the distance to the light source.

FIGS. 10A and 10B are views showing the nature of changes in the distribution of light quantity of the optical ring image when the light source LED has moved away from a position of comparatively short distance. As shown in FIG. 10A, when the distance from the light source is near, an area where brightness has become saturated (saturated area) 101 is large. However, as shown in FIG. 10B, when the light source has moved away, the saturated area becomes small. Conversely, when the distance to the light source is short, an area where brightness has not become saturated (unsaturated area) 102 is small, as shown in FIG. 10A. However, as shown in FIG. 10B, when the light source has moved away, the unsaturated area becomes larger. As mentioned above, the distribution of quantity of light in the ring image changes, and the nature of changes in the total quantity of light is actually measured. FIG. 11 shows test data in the form of a graph. The horizontal axis of the graph represents an inverse distance (1/m), and the longitudinal axis represents the total quantity of light. The total quantity of light is a value determined by integrating all brightness values of respective pixels. An area sensor having 256 levels of gray and 480×640 pixels and measuring one-third of an inch in width is utilized as the sensor. A hemispherical lens having a radius of 12 mm is for a lens having large spherical aberration. An LED is for the light source. In the test, the light source is moved over a distance of 1 m to 3.18 m in the axial direction of the lens. Solid squares in the drawing depict actually-measured data, and values of the data can be represented by an approximate expression $$y=ax^3+bx^2+cx+d \qquad \text{(Eq. 11)}$$

Reference symbol "y" depicts the integrated quantity of light received by the sensor; and "x" depicts an inverse distance to a light source. As mentioned above, the total quantity of light of the optical ring image is expressed as a function of the position of the light source. Accordingly, the position of the light source can be measured by measuring a total quantity of light of the optical ring image. As can be seen from the data, the three-dimensional position of the light source located at a comparatively far distance can be measured through the position measurement utilizing the quantity of light of the optical ring image.

When the light source is situated at a comparatively close distance, a distance is measured on the basis of the diameter of the optical ring. Concurrently, the quantity of light is measured, whereby a value determined through position measurement using the quantity of light can be amended. Although the quantity of light of the LED sometimes changes because of deterioration due to depletion or use of a battery, the diameter of the optical ring image is not influenced by the quantity of light. For this reason, the value determined through the position measurement using the quantity of light can be amended while the value measured on the basis of the diameter of the optical ring image is taken as a correct value. As a result, accuracy of position measurement using the quantity of light of the optical ring image can be maintained.

The embodiments of the present invention relates to a position measurement system which measures a distance to a light source by detecting an optical ring image formed from light from the light source through spherical aberration of a lens, and exhibits industrial applicability.

What is claimed is:

1. A position measurement system comprising:
    a photographing unit having;
        a lens forming an optical ring image from light from a light source through spherical aberration, and
        a light-receiving element detecting the optical ring image formed by the lens; and
    an arithmetic processing unit for measuring a distance to the light source on the basis of a measurement of a quantity of light of the optical ring image detected by the light-receiving element,
    wherein the arithmetic processing unit measures the distance to the light source on the basis of a quantity of light in an unsaturated area of the optical ring image detected by the light-receiving element.

2. The position measurement system according to claim 1, wherein, when the distance to the light source falls within a predetermined range, the arithmetic processing unit measures the distance to the light source on the basis of a diameter of the optical ring image detected by the light-receiving element in place of the quantity of light of the optical ring image.

3. A position measurement system comprising:
    a photographing unit having;
        a lens forming an optical ring image from light from a light source through spherical aberration; and
        a light-receiving element detecting the optical ring image formed by the lens; and
    an arithmetic processing unit measuring a distance to the light source on the basis of detection information about the optical ring image detected by the light-receiving element, and
    wherein the arithmetic processing unit measures the distance to the light source on the basis of a measurement of a quantity of light in an unsaturated area of the optical ring image detected by the light-receiving element when the distance to the light source falls outside a predetermined range, and
    the arithmetic processing unit measures the distance to the light source on the basis of a diameter of the optical ring image detected by the light-receiving element when the distance to the light source falls within the predetermined range.

4. The position measurement system according to claim 1, wherein the lens is a hemispherical lens.

5. The position measurement system according to claim 3, wherein the lens is a hemispherical lens.

6. A position measurement method comprising:
    forming an optical ring image from light from a light source through spherical aberration;
    detecting the formed optical ring image;
    measuring a distance to the light source on the basis of a measurement of a quantity of light of the detected optical ring image which corresponds to a quantity of light in an unsaturated area of the optical ring image; and
    measuring the distance to the light source on the basis of a diameter of the detected optical ring image in place of the quantity of light of the optical ring image when the distance to the light source falls within a predetermined range.

7. A position measurement method comprising:
    forming an optical ring image from light from a light source through spherical aberration, and
    detecting the formed optical ring image,
    measuring a distance to the light source on the basis of detection information about the detected optical ring image,
    measuring the distance to the light source on the basis of a diameter of the detected optical ring image when the distance to the light source falls within a predetermined range,
    measuring the distance to the light source on the basis of a measurement of a quantity of light in an unsaturated area in the detected optical ring image when the distance to the light source falls outside the predetermined range.

8. The position measurement method according to claim 6, further comprising:
    forming the optical ring image by spherical aberration of a hemispherical lens.

9. The position measurement method according to claim 7, further comprising
    forming the optical ring image by spherical aberration of a hemispherical lens.

10. A position measurement system comprising:
    a photographing unit having;
        a lens forming an optical ring image from light from a light source through spherical aberration; and
        a light-receiving element detecting the optical ring image formed by the lens; and an arithmetic processing unit measuring a first distance value to the light source on the basis of a measurement of a quantity of light of the optical ring image detected by the light-receiving element, and when the first distance value falls within a predetermined range, measuring a second distance value to the light source based on a diameter of the optical ring image detected by the light-receiving element, wherein the second distance value is taken as a correct value of a distance to the light source.

11. The position measurement method according to claim 6, further comprising:

storing the distance in a recording medium.

12. The position measurement method according to claim 10, wherein the arithmetic processing unit measures the first distance value to the light source on the basis of a quantity of light in an unsaturated area of the optical ring image detected by the light-receiving element.

* * * * *